(12) United States Patent
Ramshaw et al.

(10) Patent No.: US 7,247,202 B1
(45) Date of Patent: Jul. 24, 2007

(54) PROCESS FOR THE CONVERSION OF A FLUID PHASE SUBSTRATE BY DYNAMIC HETEROGENEOUS CONTACT WITH A SOLID AGENT

(75) Inventors: Colin Ramshaw, Ponteland (GB); Roshan Jeet Jee, Abbey Farm (GB)

(73) Assignee: Protensive Limited, Cambridge (GB)

( * ) Notice: Subject to any disclaimer, the term of this patent is extended or adjusted under 35 U.S.C. 154(b) by 0 days.

(21) Appl. No.: 09/913,966

(22) PCT Filed: Feb. 17, 2000

(86) PCT No.: PCT/GB00/00524

§ 371 (c)(1),
(2), (4) Date: Jan. 14, 2002

(87) PCT Pub. No.: WO00/48731

PCT Pub. Date: Aug. 24, 2000

(30) Foreign Application Priority Data

Feb. 17, 1999 (GB) ................................. 9903474.6

(51) Int. Cl.
C30B 15/00 (2006.01)
C30B 21/06 (2006.01)

(52) U.S. Cl. ............................. 117/14; 264/8; 264/22; 264/83

(58) Field of Classification Search ................. 117/14; 204/159.22, 159.19; 264/8, 22, 83
See application file for complete search history.

(56) References Cited

U.S. PATENT DOCUMENTS

| | | | |
|---|---|---|---|
| 3,347,620 A | 10/1967 | Yamashita | |
| 3,831,907 A | 8/1974 | Claes | |
| 4,283,255 A * | 8/1981 | Ramshaw et al. | ............ 203/49 |
| 4,311,570 A * | 1/1982 | Cowen et al. | ......... 204/157.41 |
| 4,343,750 A | 8/1982 | Holiday et al. | |
| 4,356,133 A | 10/1982 | Cowen et al. | |
| 4,400,275 A * | 8/1983 | Ramshaw et al. | ..... 210/321.68 |
| 4,511,414 A | 4/1985 | Matsui et al. | |

(Continued)

FOREIGN PATENT DOCUMENTS

CA 2180864 1/1997

(Continued)

OTHER PUBLICATIONS

Disclosed Anonymously, "Dialkylation Of Malonic Esters", Research Disclosure—Aug. 1996/479.

(Continued)

*Primary Examiner*—Yogendra Gupta
*Assistant Examiner*—G. Nagesh Rao
(74) *Attorney, Agent, or Firm*—Garvey, Smith, Nehrbass & North, L.L.C.; Seth M. Nehrbass; Brett A. North

(57) ABSTRACT

A process for the conversion of a substantially fluid phase substrate by heterogeneous contact of the substrate or a fragment or derivative thereof with a substantially solid phase agent wherein the solid phase agent is comprised as a surface of a support element or part thereof and the support element is adapted to rotate around an axis such that the solid phase agent provides a rotating surface or part thereof and the substrate provides a film flowing substantially radially outward from the axis in dynamic contact with the agent.

22 Claims, 4 Drawing Sheets

U.S. PATENT DOCUMENTS

Figure 1:
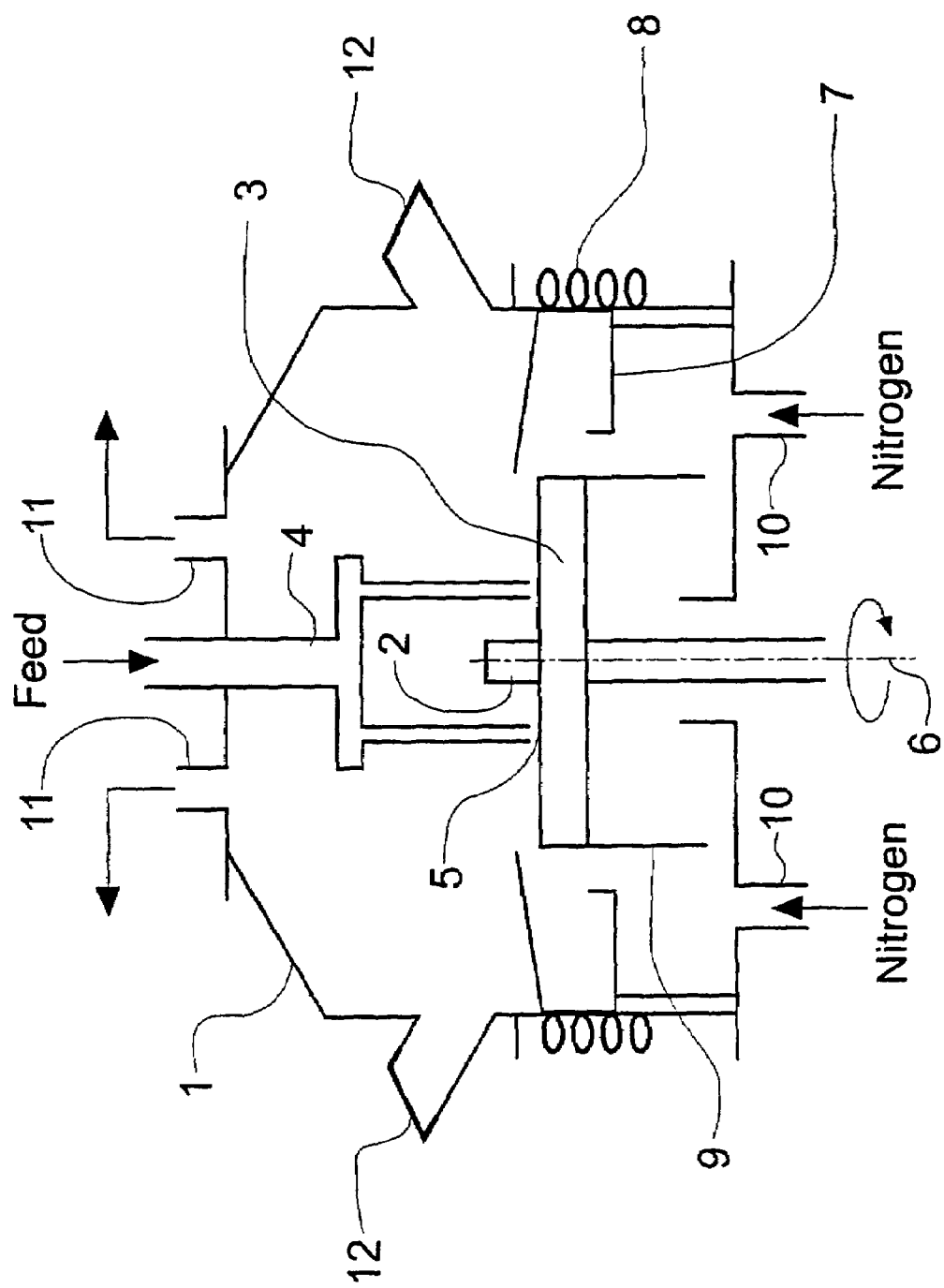

| | | | |
|---|---|---|---|
| 4,549,998 A | 10/1985 | Porter et al. | |
| 4,627,803 A | 12/1986 | Umetsu | |
| 5,624,999 A | 4/1997 | Lombardi et al. | |
| 6,858,189 B1 * | 2/2005 | Ramshaw et al. | 422/186 |
| 6,972,113 B1 * | 12/2005 | Ramshaw et al. | 422/135 |
| 6,977,063 B1 * | 12/2005 | Ramshaw et al. | 422/135 |
| 7,014,820 B2 * | 3/2006 | Ramshaw et al. | 422/135 |
| 2005/0158220 A1 * | 7/2005 | Ramshaw et al. | 422/186 |
| 2006/0095466 A1 * | 5/2006 | Stevens et al. | 707/103 R |

FOREIGN PATENT DOCUMENTS

| | | |
|---|---|---|
| EP | 0 020 055 | 12/1980 |
| EP | 0 499 361 A1 | 8/1992 |
| EP | 0 810 633 A2 | 12/1997 |
| GB | 328410 | 5/1930 |
| GB | 1080863 | 8/1967 |
| GB | 1600708 | 10/1981 |
| GB | 2108407 | 5/1983 |
| GB | 2241774 A | 9/1991 |
| GB | 0 499 362 A1 | 8/1992 |
| WO | WO 96/00189 | 1/1996 |

OTHER PUBLICATIONS

R.J.J. Jachuck and C. Ramshaw, "Process Intensification: Heat Transfer Characteristics of Tailored Rotating Surfaces", Heat Recovery Systems & CHP, vol. 14, No. 5, pp. 475-491, 1994, Ebevier Science Ltd., Great Britain.

* cited by examiner

PROCESS FOR THE CONVERSION OF A FLUID PHASE SUBSTRATE BY DYNAMIC HETEROGENEOUS CONTACT WITH A SOLID AGENT

The present invention relates to a process for the conversion of a substantially fluid phase substrate by heterogeneous contact with a substantially solid phase agent, the agent for use in the process, an apparatus therefor comprising the agent, novel agent compositions, substrate compositions and the products thereof.

In particular the present invention relates to a process for the conversion of a substrate using an agent which is comprised as a rotating surface, the apparatus, agent, and compositions for use therein and the products thereof.

The invention makes use of rotating surfaces of revolution technology (hereinafter RSORT) (commonly known as spinning disc technology).

The spinning disc concept is an attempt to apply process intensification methods within the fields of heat and mass transfer. The technology operates by the use of high gravity fields created by rotation of a disc surface causing fluid introduced to the dire surface at its axis to flow radially outward under the influence of centrifugal acceleration in the form of thin often wavy films. Such thin films have been shown to significantly improve the heat and mass transfer rates and mixing. The technology was developed for typical heat and mass transfer operations such as heat exchanging, heating, cooling and mixing, blending and the like, for example as disclosed in R J J Jachuck and C Ramshaw, "Process Intensification: Heat transfer characteristics of tailored rotating surfaces", Heat Recovery Systems & CHP, Vol. 14, No 5, p 475-491, 1994.

More recently the technology has been adapted for use as a reacting surface for systems which are heat and mass transfer limited, for example for the reaction of substrates which are highly viscous during at least a stage of the reaction and cause problems in achieving good mixing and product yields.

Boodhoo, Jachuck & Ramshaw disclose in "Process Intensification: Spinning Disc Polymeriser for the Manufacture of Polystyrene" the use of a spinning disc apparatus in which monomer and initiator is reacted by conventional means to provide a pre-polymer which is then passed across the surface of a spinning disc at elevated temperature providing a conversion product in the form of polymerised styrene.

EP 0 499 363 (Tioxide Group Services Limited) discloses another use for spinning disc technology in photo catalytic degradation of organic materials such a hydrocarbons. A solution of salicylic acid and titanium dioxide catalyst was passed across the surface of a rotating disc and irradiated with ultra violet light.

These publications therefore disclose the use of spinning disc technology for heating and mass transfer in inert and reactive systems.

We have now surprisingly found that spinning disc technology may be further adapted to apply process intensification methods not only within the fields of heat and mass transfer but also within the field of heterogeneous contacting.

We have further surprisingly found that the quality of the product obtained is of higher quality than that obtained by conventional processing having, for example, a higher purity or, in polymers, a narrower molecular distribution.

In addition to this, spinning disc technology can be used to obtain products not readily obtainable by other technology.

Accordingly in its broadest aspect there is provided according to the present invention a process for the conversion of a substantially fluid phase substrate by heterogeneous contact of the substrate or a fragment or derivative thereof with a substantially solid phase agent wherein the solid phase agent is comprised as a surface of a support element or part thereof and the support element is adapted to rotate around an axis such that the solid phase agent provides a rotating surface or part thereof and the substrate provides a film flowing substantially radially outward from the axis in dynamic contact with the agent; characterised in that additional vibrational energy is applied to the substrate.

Reference herein to a rotating surface is to any continuous or discrete planar or three dimensional surface or assembly which rotates approximately or truly about an axis, and preferably is reference to an approximate or true rotating surface of revolution. An approximate rotating surface of revolution may comprise an asymmetric axis and/or deviation in the surface body and/or circumference creating an axially or radially undulating surface of revolution. A discrete surface may be in the form of a mesh, grid, corrugated surface and the like.

Reference herein to a substantially radially outward flowing film as hereinbefore defined is to any fluid film which may be created by dynamic contact of the fluid phase substrate and the rotating surface as hereinbefore defined, suitably the fluid phase substrate is contacted with the rotating surface at any one or more surface locations and caused to flow outwardly by the action of centrifugal force. A film may be a continuous annulus or may be a non-continuous arc at any radial location. The substrate may provide a plurality of films in dynamic contact with a rotating surface as hereinbefore defined.

Reference herein to an agent is to any agent which enables, facilitates or otherwise influences conversion of the fluid phase substrate by contact, and includes a nucleation or growth agent adapted for fluid substrate conversion by phase change to form crystals or grow seed crystals, a reagent, catalyst or initiator adapted for fluid phase substrate conversion by reaction to form products, and the like.

The agent may be capable of being immobilised on the surface of a support element which is adapted to rotate as hereinbefore defined or may be comprised as an integral part of the surface as past of the construction thereof. The agent may be adapted to achieve conversion by means of its composition or of its configuration, ie may be a chemical, electronic or like entity or may be a feature of shape.

Reference herein to a substrate is to the substrate to be converted or its fragment or derivative formed as part of the contacting with additional substrates, the rotating surface or the agent.

The process of the present invention may be used for any desired heterogeneous conversion of one or more substrates, or of one or more fragments or derivatives thereof and is particularly useful for conversions which are heat and/or mass transfer limited. By this means the process of the present invention is able to substantially improve process performance in terms of yield and selection of desired products by ensuring that heterogeneous contact is optimal and occurs at optimum conditions of temperature, concentration, contact time and the like.

Preferably the process of the invention is a process for conversion of organics (e.g. hydrocarbons and other organic materials), such as prepolymerisation, polymerisation, copolymerisation, block polymerisation and the like, upgrading of base hydrocarbons to provide petrochemicals for chemical, fuel or additives applications, for example etherification, dimerisation, alkylation, upgrading low value higher chain ($C_{10+}$) to high value lower chain branched ($C_{2-8}$) hydrocarbons, upgrading by decomposition (for example breakdown of salicylic acid) and the like. The process is also admirably suited for adaptation of existing homogeneous processes such as alkylation to form branched hydrocarbons and ethers, to heterogeneous alternatives, using solid acids such as zeolites and the like.

Alternatively the process is a process for the crystallisation of a salt from a solution formed prior to or during contact with the rotating surface.

The process may therefore comprise a conversion of one substrate with itself in the presence of an agent as hereinbefore defined or may comprise the conversion of one substrate with one or more additional substrates in the presence of an agent as hereinbefore defined. Substrate(s) is fluid and may be gaseous, vaporous, liquid or fine flowable solid.

The conversion may be carried out entirely or in part under the influence of an added energy source which may be a source of thermal or radiation energy such as ultra violet, micro wave, infra-red, x-ray, or at elevated pressure or under the influence of electric or magnetic fields.

The process of the invention as hereinbefore defined may operated in a single or plural stages. A plural stage conversion may comprise a first pre-conversion stage with further post conversion or upgrading stages, and may be carried out batchwise with use of a single rotating surface as hereinbefore defined or may be carried out in continuous manner with multiple rotating surfaces in series.

The process is particularly suited to continuous conversion, and may provide means to perform hitherto batch wise conversions in continuous manner, by means of the improved conversion efficiency and regulated contact time obtained with the invention.

For example conversions requiring extended contact time may be carried out in continuous manner with use of a recycle of fluid exiting at the periphery of the rotating disc towards the axis of the rotating disc enabling sequential passes of fluid across the surface. In continuous steady state operation an amount of fluid exiting the disc may be drawn off as product and an amount may be returned by recycle for further conversion with an amount of fresh substrate feed.

Second or more substrates may be added to the substrate as it passes from one rotating assembly to the next or be added directly to the rotating assembly anywhere between the axis of rotation or the exit from the assembly. In certain cases a multi-step conversion process may be achieved by substrate addition or additions between the axis of rotation and the exit of a single rotating assembly to achieve more than one conversion step in a single pass. It is also possible to have more than one agent on the surface either intermixed or at different radial locations in order to facilitate more than one conversion or conversion stage. These different sections may be controlled at different temperatures and conditions and have different surface geometries as appropriate to the process needs.

Conversion may be carried out with initiation and/or quench a known in the art. It is of a particular advantage of the invention that a plural stage process may employ a pre-mixing stage enabling rapid blending of any diluents or solvent with substrate, or of plural substrates, followed by a conversion stage as hereinbefore defined and a post-conversion quench stage in which reacted product exits the rotating surface at the periphery thereof and is collected in a suitable collection means or on a third stage rotating surface on which quench may be performed by the blending of a quench medium or by cooling. The process of the invention enables rapid homogeneous quenching.

It will be apparent that the process of the invention may be controlled both by selection of a specific rotating surface for use a agent support, by nature of immobilisation of agent thereon and by selecting process variables such as temperature, speed of rotation, rate of substrate feed, conversion time and the like. Accordingly the process of the invention provides enhanced flexibility in process control including both conventional control by means of operating conditions, and additionally control by means of rotating surface type and nature of agent immobilisation.

Agents may be immobilised on the rotating surface by any means known in the art for supporting agents, suitably by means of spraying such as plasma spraying of solutions of metals, sol gel impregnating with drying and optional calcining or reduction and the like. Agent may be mechanically or chemically immobilised or both. Preferably agent is mechanically coated and chemically immobilised to interact with and bond with the rotating surface in manner to ensure coherent coating with any desired distribution and loading of agent.

Agents may be supported directly on the rotating surface or may be supported on a surface coating of a material adapted to provide surface features or enhanced surface area. For example the rotating surface may be provided with enhanced surface area in the form of macro surface features such a corrugated continuous surface for example of a metal foil and the like or micro features such as a coating of microporous material such as zeolite or refractory oxide and the like. The agent may be provided with any additional coating to enhance its conversion performance.

The method of preparing the agent may also be selected according to the nature of the agent itself.

Accordingly coating the rotating surface with agent by spraying is particular suited in case of agents in the form of metal catalyst such as metal or alloy powder which are commonly used for example in hydrogenation reactions and the like.

Coating with a sol gel is particularly suited for use with agents in the form of materials which readily form sol gels, such as inorganic oxide catalysts which are commonly used for example in oxidation and partial oxidation reactions.

The coating techniques may be used as commonly known in the art, with use of known spray apparatus and dipping methods. In the case of non planar rotating surfaces or rotating surfaces with additional surface features it may be desired to adapt the known techniques to ensure uniformity of coating, and avoid any distortion by virtue of gravitational, meniscal, capillary effects and the like. These effects may suitably be overcome with known methods in which an electrostatic field is applied to one object to be coated during the coating process, or with sol gel techniques in which the colloidal structure of the solution comprising a suspension of solid particles of colloidal dimensions in a liquid is less prone to gravitational effects, meniscal or capillary effects, optionally additionally mounting the rotating surface in manner to allow vertical rotation during drying and calcining.

A RSORT apparatus (commonly known as a spinning disc reactor) generally includes within a conversion chamber a rotating surface or an assembly of a plurality of these which is rotated about an axis to effect transfer of one or more substrates from the axis preferably radially across the rotating surface.

A RSORT apparatus as hereinbefore defined comprising a rotating surface as hereinbefore defined has a number of advantageous constructional features according to the present invention.

Any suitable feed means may be provided to feed the at least one substrate onto the rotating surface. For example, the feed means may comprise a feed distributor in the form of a "shower head", a "necklace" of outlets for a simple, preferably adjustable, single point introduction such as a "hose-pipe type" feed means. Preferably, the feed means comprises a feed distributor having a plurality of uniformly spaced outlets for the at least one substrate on to the rotating surface as hereinbefore defined.

The feed means may be provided at any suitable position with respect to the rotating surface which allows feed of the substrate. For example, the feed means may be axially aligned with the rotating surface for axial feed. Alternatively, the feed means may be positioned such that the feed is spaced from the axis of the rotating surface. Such a position may lead to more turbulence and an enhanced mixing effect. In a further alternative embodiment, feed means may comprise a single feed to a trough which is preferably situated on or co-axial with the axis of rotation of the rotating surface. In this alternative embodiment, substrate flows form the feed outlet into the trough and is subsequently spread out of the trough on to the rotating surface by centripetal force. In a preferred embodiment, the rotating element as hereinbefore defined comprises a trough situated on the axis of rotation.

The trough as hereinbefore defined may be of any suitable shape such as continuous or annular. For example it may have a continuous concave surface comprising part of a sphere, such as a hemispherical surface of it may have an inner surface joined to the rotating surface by at last one connection wall or at least two, in the case where the trough is annular. The inner surface and connection wall may be of any form which allows the function of a trough to be fulfilled. For example the inner surface may be parallel to the rotating surface or concave or convex. The connection wall may comprise a single circular or ovoid wall or a plurality of straight walls. The walls may diverge or converge towards the rotating surface.

Preferably, a single circular wall is provided which converges towards the rotating surface to form an undercut trough. This shape generates a reservoir which enhances a circumferential distribution of the substrate flow.

The trough may be lined, coated or otherwise provided with a solid phase agent as hereinbefore described, such as a catalytic material.

Advantageously, a matrix may be provided in the trough so as to help reactant present in the trough to rotate with the support element, thereby helping to achieve substantially uniform flow from the trough across the first surface. The matrix may be in the form of a plug of fibrous mesh, such as metal or plastics wool, or may take the form of a plurality of projections which are secured to an inner surface of the trough. Other matrix means will be apparent to the skilled reader. In some embodiments, the matrix is manufactured of a material which is inert with respect to the at least one reactant or the product and which is not significantly affected by temperature and other variable process conditions. Alternatively, the matrix may be made of or coated with a material which does interact with the at least one reactant or the product, such as a heterogeneous catalyst (e.g. nickel, palladium or platinum or any suitable metal or alloy or compound thereof) or any of the solid phase agents as hereinbefore described. Where the matrix is made out of an electrically conductive material, it may be possible to supply an electric current therethrough and thus to provide heating means for heating the at least one reactant within the trough.

Any suitable collection means may be provided for collection of the product as it leaves the rotating surface at its periphery. For example, a receptacle in the form of a bowl or trough at least partially surrounding the rotating element or other fixed part of the apparatus. The collection means may additionally comprise a deflector positioned around the periphery of the rotating surface to deflect product into the collection means. The deflector is preferably positioned at an acute angle to the rotating surface.

The components of the collection means, such as the bowl or trough or deflector, may be coated or otherwise provided with a solid phase agent as hereinbefore described, such as a heterogeneous catalyst appropriate to the fluid phase substrate being processed on the support element, or may even consist entirely of a material which acts as a heterogeneous catalyst. Furthermore, the components of the collection means may be heated or cooled to a predetermined temperature so as to enable control over reaction parameters, for example by serving to halt the processing of substrate as this leaves the surface of the support element. Feed means for supplying a further substrate to the substrate leaving the surface may also be provided. For example, there may be provided feed means for feeding a quenching medium to substrate in the collection means so as to halt chemical or other reactions of the substrate when this has left the surface.

The collection means may further comprise outlet means of any suitable form. For example, there may be a single collection trough running around the periphery of the disc or a collection bowl partially surrounding the rotating element.

Outlet means may also be provided in the collection means and these may take the form of apertures of any size and form situated at any suitable position of the collection means to allow egress of the product. In one preferred embodiment, the outlet means are situated to allow vertical egress of the substrate in use.

The apparatus may further comprise any suitable control system. Such a control system may regulate the temperature or contact time of substrate and agent by means of speed of rotation, rate of substrate feed and other process parameters to obtain an optimum result.

The apparatus as hereinbefore defined may comprise means for optimising conversion conditions. For example, means for imparting an additional movement to the rotating surface, and thus to the substrate, may be provided. Such movement could be in any desired plane or plurality of planes and preferably comprises vibration. Any suitable vibration means may be provided, such as flexible mounting of the surface or off centre mounting, both inducing passive vibration or active vibration means, such as a mechanical element in contact with the rotating element and vibrating in a direction parallel to the rotating element axis. Preferably a passive vibration means is provided in the form of off centre mounting of the rotating element on its axis of rotation. Vibration may alternatively be provided by an ultrasonic emitter in contact with the rotating element for vibration in any desired plane or plurality of planes.

The rotating surface may have any shape and surface formation to optimise conversion conditions. For example the rotating surface may be generally planar or curved, frilled, corrugated or bent. The rotating surface may form a cone or be of generally frusto conical shape.

In one preferred embodiment the rotating surface is generally planar and preferably generally circular. The periphery of the rotating surface may form an oval, rectangle or other shape.

In another preferred embodiment the rotating surface is provided as the inner surface of a cone. The apparatus may comprise at least one cone and at least one other rotating surface or at least one pair of facing cones positioned so as to allow a two stage process of pre-conversion and conversion or pre-blending and conversion with one or more substrates fed to each cone. Preferably substrates or pre-reacted substrate exits a smaller cone (or other surface of rotation) in a spray on to the surface of a larger cone (or other surface of rotation) by which it is at least partially surrounded and for the surface of which a further substrate is fed by feed means as hereinbefore defined, to allow mix of the two substrates on the larger rotating surface. Preferably, means are provided such that the two cones counter rotate. Such an arrangement enhances mixing and intimate contact of the substrates and reduces the required physical contact time. Alternatively, means are provided such that the cones co-rotate or one is stationary.

A rotating surface of any shape and surface formation as hereinbefore defined may be provided with surface features which, in addition to the immobilised agent, serve to promote conversion. For example, the surface may be micro or macro profiled, micro or macro porous, non stick, for example may have a release coating, may be continuous or discontinuous and may comprise elements such as mesh, for example woven mesh, reticulate foam, pellets, cloth, pins or wires, for enhanced surface area, enhanced or reduced friction effect, enhanced or reduced laminar flow, shear mixing of recirculation flow in axial direction and the like.

In one preferred embodiment, mixing characteristics of the rotating surface are enhanced by the above features or the like provided on or in the rotating surface. These may be provided in any suitable regular or random arrangement of grids, concentric rings, spider web or like patterns which may be suitable for a given application.

Alternatively or additionally to any other surface feature, radially spaced pins in the form of circles or segments of circles may be provided.

In another preferred embodiment, a porous surface coating is provided, which aids conversions of certain substrates. Such a coating may be provided in combination with any other of the aforementioned surface features.

Surface features in the form of grooves may be concentric or may be of any desired radially spaced form. For example, the grooves may form "wavy" or distorted circles for maximised mixing.

Grooves may be parallel sided, or may have one or both sides which diverge to form undercut grooves or which converge to form tapered grooves. Preferably, the grooves are undercut to promote mixing.

Grooves may be angled to project towards or away from the axis of the rotating surface to enhance or reduce undercut or taper.

Energy transfer means may be provided for the rotating surface or substrate as hereinbefore described. For example heating means may be provided to heat the substrate, for example, as part of the feed means. Additionally, or alternatively heating means may be provided to heat the rotating element in the form of radiant or other heaters positioned on the face of the rotating element which does not comprise the rotating surface for conversion. Preferably, radially spaced, generally circular radiant heaters are provided.

Any preferred cooling or quenching means may be provided in a suitable position to cool the reacted substrate. For example cooling coils or a heat sink may provide cooling by heat exchange, or a reservoir of quench may provide cooling or reaction termination by intimate mixing in the collection means.

Cooling means for the substrate may be provided in any suitable position, such as on, in or near the deflector or collection means.

Multiple rotating elements may be provided in an apparatus as hereinbefore defined. For example the rotating elements may be provided in series within the apparatus, with reacted substrate form the first disc being fed directly to at least one further disc.

Alternative or additionally, rotating elements may be provided in parallel with a single reservoir of substrate fed simultaneously to a plurality of discs. In this preferred embodiment a single collection means may be envisaged. The invention is now illustrated in non-limiting manner with reference to the following figures and examples.

EXAMPLE 1—POLYMERISATION OF ETHYLENE USING A CATALYST COATED DISC

Phillips catalyst was coated onto the surface of a spinning disc apparatus using methods as described hereinbefore. The coated disc was mounted in a spinning disc apparatus.

The spinning disc apparatus used is shown in diagrammatic form in FIG. 1. The main components of interest being:

i) Top Disc—A smooth brass disc of thickness 17 mm and diameter 500 mm capable of rotating around a vertical axis.

ii) Liquid Distributor—A circular copper pipe of diameter 100 mm, positioned concentrically over the disc, sprayed fluid vertically onto the disc surface from 50 uniformly spaced holes in the underside. Flowrate was controlled manually by a valve and monitored using a metric 18 size, stainless steel float rotameter. A typical fluid flow rate was 31.3 cc/s.

iii) Motor—A variable speed d.c. motor capable of rotating at 3000 rpm was used. The rotational speed was varied using a digital controller calibrated for disc speeds between 0 and 1000 rpm. A typical rotational speed was 50 rpm.

iv) Radiant Heaters—3 radiant heaters (each consisting of two elements) spaced equally below the disc provided heat to the disc. The temperature was varied using a temperature controller for each heater. Each heater temperature could be controlled up to 400° C. Triac regulators were used to control the speed of the controller response. (These remained on setting 10 throughout the tests).

v) Thermocouples and Datascanner—16 K-type thermocouples embedded in the top disc gave an indication of the surface temperature profile along the disc radius. Odd numbered thermocouples 1 to 15 inclusive were embedded from underneath the disc to a distance 3 mm from the upper disc surface. Even numbered thermocouples, 2 to 16 inclusive were embedded from underneath the disc to a distance 10 mm from the upper disc surface. Each pair of thermocouple, ie 1 & 2 and 3 & 4 and 5 & 6 etc, were embedded adjacently at radial distances of 85 mm, 95 mm, 10 mm, 128 mm, 150 mm, 175 mm, 205 mm and 245 mm respectively (see FIG. 3). The thermocouples were connected to the datascanner which transmitted and logged the data to the PC at set intervals using the DALITE Configuration and Monitoring Software Package.

vi) Manual Thermocouple—A hand-held K-type thermocouple was used to measure the bulk fluid temperature on top of the disc.

Figure 4:
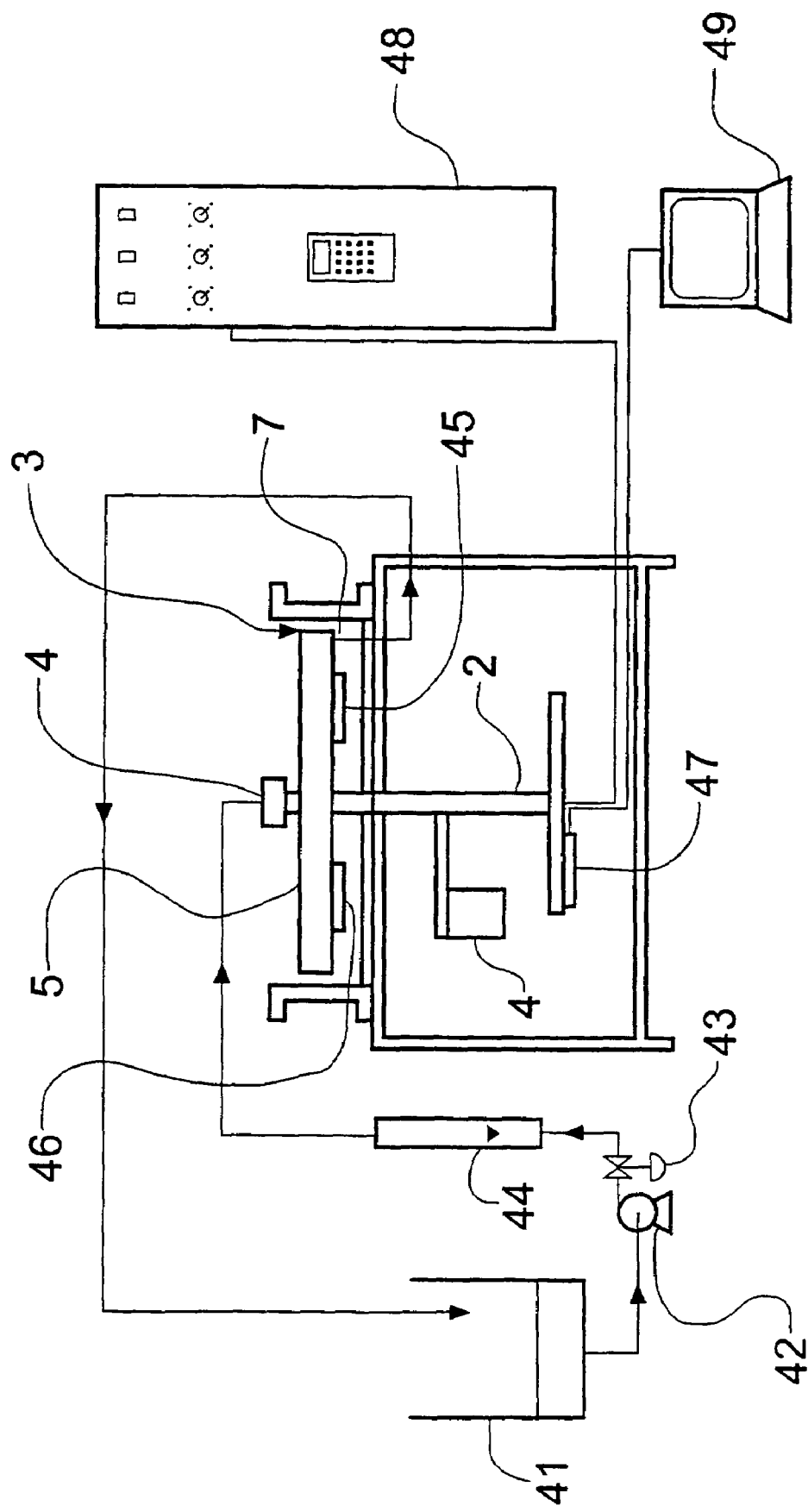

The rig was used in two arrangements. In one arrangement, feed was constantly added and the heated product was sent to the collection trough. In an alternative arrangement the rig was assembled with a recycle. The fluid flowpath in the recycle arrangement is shown in FIG. 4.

The spinning disc apparatus of FIG. 1 was started up and temperature and rotational speed adjusted. When steady stage was achieved gaseous ethylene was fed to the revolving catalyst coated disc surface at it axis. Product was withdrawn in the collection trough at the periphery of the disc. Analysis revealed the product was high grade polyethylene.

EXAMPLE 2—PRECIPITATION OF BARIUM SULPHATE CRYSTALS USING A DISC PROVIDING A NUCLEATION/GROWTH ROTATING SURFACE

A nucleation surface was provided on the surface of a disc adapted to provide a rotating surface using methods as described hereinbefore. The disc was mounted in a spinning disc apparatus.

The spinning disc apparatus used is as described in Example 1. Barium chloride and sodium sulphate solutions were reacted on the surface of the spinning disc. Barium sulphate crystals precipitated out from the solution and the effect of rotational speed on the crystal size and size distribution was studied.

EXAMPLE 3—PRECIPITATION OF CALCIUM CARBONATE CRYSTALS USING A DISC PROVIDING A NUCLEATION/GROWTH ROTATING SURFACE

A nucleation surface was provided on the surface of a disc adapted to provide a rotating surface using methods as described hereinbefore. The disc was mounted in a spinning disc apparatus.

The spinning disc apparatus used is as described in Example 1. Calcium hydroxide and carbon dioxide (gas/liquid) were reacted on the surface of the disc and the effect of rotational speed on the crystal size and size distribution was studied.

FIG. 1 illustrates a conventional spinning disc apparatus which is suited for adaptation according to the present invention. The apparatus s enclosed in vessel (1) having at its axis a drive shaft (2) supporting a spinning disc (3). Feed means (4) provides substrate to the surface of the disc (5) at its axis (6). Rotation of the disc causes substrate to flow radially outwards, whereby it contacts the surface of the spinning disc. Fluid is collected at the peripheral edges of the disc by means of collection trough (7) and may be rapidly quenched by means of cooling coils (8). A skirt (9) prevents meniscal draw back of fluid contaminating the drive shaft mechanism. Inlet means (10) enable controlled environment conditions to the provided, for example a nitrogen atmosphere. Outlet vent means (11) enable the venting of atmospheric gases or gases evolved during operation. Observation means are provided by means of windows (12) to observe the progress of the conversion.

Figure 2:
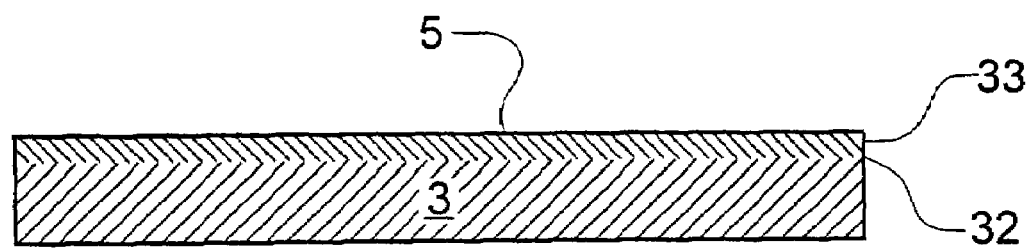

In FIG. 2 is shown a typical spinning disc in the form of a rotating surface according to the present invention comprising an immobilised agent on its surface. The disc (3) is illustrated without any additional surface features and comprises uniform coating (33) which is fused by chemical interaction (32) with the disc surface.

Figure 3:
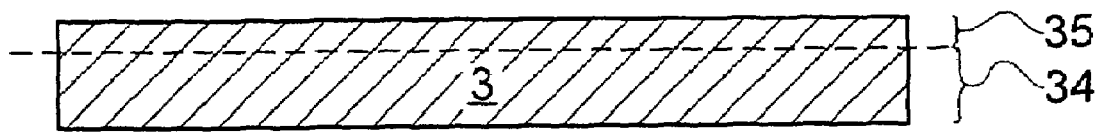

In FIG. 3 is shown an alternative spinning disc in which the agent which it is desired to immobilise is also known as a conventional support material, for example a refractory oxide. In this case the spinning disc (3) is constructed entirely of refractory oxide, the body of which (34) provides a support function and the surface of which (35) provides a catalytic function.

In the process of the invention an apparatus of FIG. 1 is started up and operated as described in Example 1. In the case that the process is an exothermic conversion, cooling coils (8) may be used to quench the collected product in the trough (7). The spinning disc is provided with beating coils (not shown) which may be used to initiate or maintain conversion. The disc or the reactor vessel may be provided with a source of radiation, means for applying an electric or magnetic field and the like as described, at or above the disc surface or at the wall of the reactor vessel.

FIG. 4 shows an alternative reactor including a spinning disc (3) mounted on a drive shaft (2) connected to a motor (40). Feed means (4) supplies reactant to a central portion of the surface (5) of the disc (3), and collector means (7) collects product thrown from the surface (5). The product is taken to a feed tank (41) from where it is pumped by pump (42), through a flowrate control valve (43) and rotameter (44) before being recycled to the feed (4). Electric heaters (45) and thermocouples (46) are provided underneath the disc (3) and connected to a datascanner (47) and a control unit (48) which serves to regulate the temperature of the disc (3) and its rotational speed. A datalogger (49) is provided to record process details such as temperatures and rotational speeds.

Figure 5:
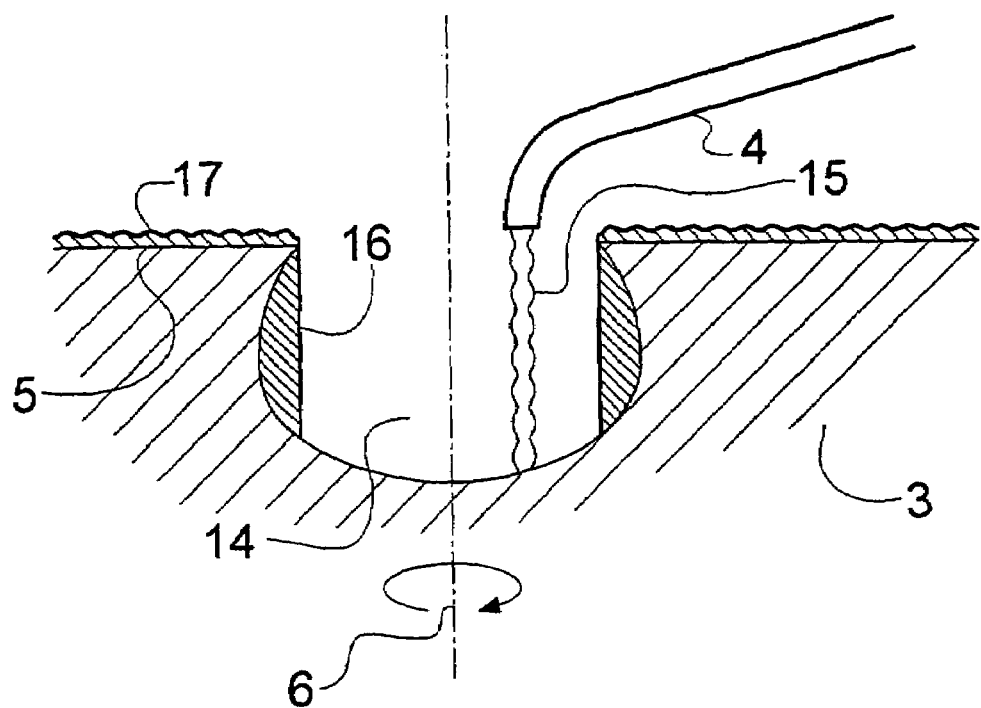

In FIG. 5 there is shown an axially located central trough (14) which is continuous and forms a well situated on the axis of rotation (6) of the rotating surface (5) of a disc (3). Rotation causes reactant (15) supplied by the feed means (4) to flow to the wall and form an annular film (16) within the trough (14). The annular film (16) then spills over onto the surface (5) of the disc (3) to form a film (17) on the surface (5).

Figure 6:
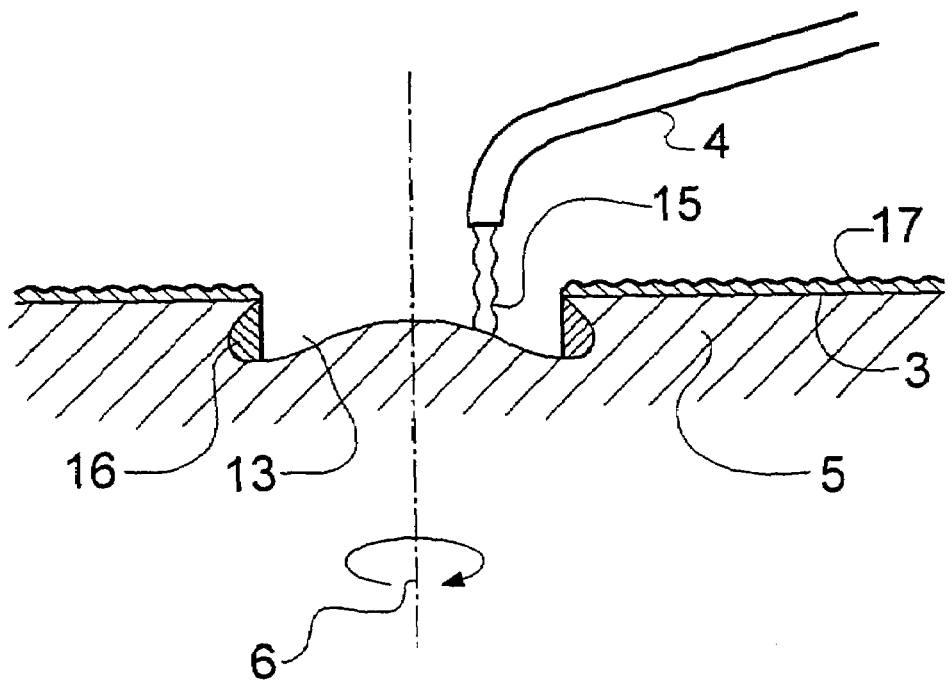

In FIG. 6 the trough (13) is annular and forms a channel co-axial about the axis of rotation (6) of the disc (3). Rotation assisted by the trough profile causes reactant (15) to flow into the trough (13) and to the wall thereof and form an annular film (16) within the trough (13) before spilling over onto the surface (5) of the disc (3) in the form of a film (17).

Further advantages of the invention are apparent from the foregoing.

The invention claimed is:

1. A process for the conversion of a substantially fluid phase substrate by heterogeneous contact of the substrate or a fragment or derivative thereof with a substantially solid phase agent wherein the solid phase agent is comprised as a surface of a support element or part thereof and the support element is adapted to rotate around an axis such that the solid phase agent provides a rotating surface or part thereof and the substrate provides a film flowing substantially radially outward from the axis in dynamic contact with the agent; characterised in that additional vibrational energy is applied to the substrate.

2. A process according to claim 1, wherein the additional vibrational energy is applied to the substrate when on the rotating surface.

3. A process according to claim 1, wherein the additional vibrational energy is applied to the substrate as it is being supplied to the rotating surface.

4. A process according to claim 1, wherein the additional vibrational energy is applied to the substrate after it has flowed across the rotating surface.

5. A process for the conversion of a substantially fluid phase substrate by heterogeneous contact of the substrate or a fragment or derivative thereof with a substantially solid phase agent wherein the solid phase agent is comprised as a surface of a support element or part thereof and the support element is adapted to rotate around an axis such that the solid phase agent provides a rotating surface or part thereof and the substrate provides a film flowing substantially radially outward from the axis in dynamic contact with the agent; characterised in that additional vibrational energy is applied to the substrate, wherein the additional vibrational energy is applied as ultrasound.

6. A process according to claim 1, wherein the rotating surface is mechanically vibrated.

7. A process according to claim 1, wherein the rotating surface is mounted off-centre on the axis of rotation.

8. A process according to claim 1, wherein the surface is flexibly mounted on the support element.

9. A process according to claim 1, wherein a mechanical vibrator is attached to the surface or the support element.

10. A process according to claim 5, wherein the axis is substantially vertical with the support element adapted to rotate thereabout with the surface uppermost, and wherein ultrasound is applied to the substrate from an ultrasonic emitter located above the surface.

11. A process according to claim 1, wherein the solid phase agent is in the form of a mesh, grid or corrugated surface.

12. A process according to claim 1, wherein the solid phase agent comprises a nucleation or growth agent adapted for fluid phase substrate conversion by phase change to form crystals or grow seed crystals.

13. A process according to claim 1, wherein the solid phase agent comprises a reagent, catalyst or initiator adapted for fluid phase substrate conversion by reaction to form products.

14. A process according to claim 13, wherein the solid phase agent is a zeolite.

15. A process according to claim 13, wherein the solid phase agent is a refractory oxide.

16. A process according to claim 13, wherein the solid phase agent is a sol gel.

17. A process according to claim 13, wherein the solid phase agent is Phillips catalyst.

18. A process according to claim 12, wherein the solid phase agent is sprayed onto the surface.

19. A process according to claim 1, wherein additional thermal or radiation energy, including UV, IR, microwave, RF, X-ray, electric fields and magnetic fields, is applied to the substrate.

20. A process according to claim 13, wherein the solid phase agent is sprayed onto the surface.

21. A process according to claim 1, wherein passive vibration is induced.

22. A process according to claim 1, wherein active vibration is induced.

* * * * *